(12) United States Patent
Christmas et al.

(10) Patent No.: US 9,891,586 B2
(45) Date of Patent: Feb. 13, 2018

(54) NEAR-EYE DEVICE

(71) Applicant: Daqri Holographics Limited, Buckinghamshire (GB)

(72) Inventors: Jamieson Christmas, Milton Keynes (GB); Dackson Masiyano, Milton Keynes (GB)

(73) Assignee: DAQRI Holographics Limited, Buckinghamshire (GB)

( * ) Notice: Subject to any disclaimer, the term of this patent is extended or adjusted under 35 U.S.C. 154(b) by 0 days.

(21) Appl. No.: 14/783,664

(22) PCT Filed: Mar. 31, 2014

(86) PCT No.: PCT/GB2014/051008
§ 371 (c)(1),
(2) Date: Oct. 9, 2015

(87) PCT Pub. No.: WO2014/167290
PCT Pub. Date: Oct. 16, 2014

(65) Prior Publication Data
US 2016/0077339 A1    Mar. 17, 2016

(30) Foreign Application Priority Data

Apr. 12, 2013 (GB) .................................. 1306763.2

(51) Int. Cl.
*G03H 1/22* (2006.01)
*G03H 1/16* (2006.01)
(Continued)

(52) U.S. Cl.
CPC ....... *G03H 1/2294* (2013.01); *G02B 27/0172* (2013.01); *G03H 1/16* (2013.01);
(Continued)

(58) Field of Classification Search
CPC ...... G03H 1/16; G03H 1/2205; G03H 1/2294; G03H 2001/0816; G03H 2225/32; G03H 2227/02; G03H 2270/55; G02B 27/0174
See application file for complete search history.

(56) References Cited

U.S. PATENT DOCUMENTS

2010/0046050 A1* 2/2010 Kroll ...................... G03H 1/02
359/9
2010/0165429 A1* 7/2010 Buckley ................. G02B 26/06
359/9
(Continued)

FOREIGN PATENT DOCUMENTS

WO    WO 2007/131649 A1    11/2007
WO    WO 2007/131650 A1    11/2007
(Continued)

OTHER PUBLICATIONS

International Search Report of International Application No. PCT/GB2014/051008 dated Jul. 18, 2014, 5 pages.
(Continued)

*Primary Examiner* — Darryl J Collins
*Assistant Examiner* — Journey Sumlar
(74) *Attorney, Agent, or Firm* — McDonnell Boehnen Hulbert & Berghoff LLP

(57) ABSTRACT

A near-eye device includes a spatial light modulator and a beam combiner. The spatial light modulator includes an array of phase modulating elements arranged to apply a phase delay distribution to incident light. The beam combiner includes a first optical input arranged to receive spatially modulated light from the spatial light modulator and a second optical input having a field of view of the real world.

16 Claims, 7 Drawing Sheets

(51) Int. Cl.
*G02B 27/01* (2006.01)
*G03H 1/08* (2006.01)
(52) U.S. Cl.
CPC ... *G03H 1/2205* (2013.01); *G02B 2027/0174* (2013.01); *G03H 2001/0816* (2013.01); *G03H 2001/2284* (2013.01); *G03H 2225/32* (2013.01); *G03H 2227/02* (2013.01); *G03H 2270/55* (2013.01)

(56) References Cited

U.S. PATENT DOCUMENTS

| | | | |
|---|---|---|---|
| 2011/0128555 A1* | 6/2011 | Rotschild | G02B 27/2271 356/625 |
| 2011/0157667 A1 | 6/2011 | Lacoste et al. | |
| 2012/0306940 A1 | 12/2012 | Machida et al. | |

FOREIGN PATENT DOCUMENTS

| | | | | |
|---|---|---|---|---|
| WO | WO-2012-007762 | * | 1/2012 | ............ G03H 1/08 |
| WO | WO 2012/007762 A1 | | 1/2012 | |
| WO | WO 2012/062681 A1 | | 5/2012 | |
| WO | WO 2013/049248 A2 | | 4/2013 | |

OTHER PUBLICATIONS

Written Opinion of International Application No. PCT/GB2014/051008 dated Jul. 18, 2014, 5 pages.
British Search Report of British Application No. GB1306763 dated Oct. 27, 2014, 4 pages.

* cited by examiner

NEAR-EYE DEVICE

FIELD OF THE INVENTION

The present disclosure relates to the field of near-eye devices such as goggles or glasses. Embodiments disclosed herein generally relate to near-eye devices for augmenting a real world scene or for augmented reality. More specifically, embodiments disclosed herein generally relate to holographic projection for augmented reality such as a phase-only holographic projection technique for augmented reality.

BACKGROUND

Near-eye devices for augmented reality, and the like, are being developed.

A known near-eye device is shown in FIG. 1. FIG. 1 shows a light source 101 and collimating lens 103 arranged to illuminate a spatial light modulator 107 via a beam splitter 105. Spatial light modulator 107 comprises an array of amplitude modulating elements arranged to form an image. More specifically, the amplitude of light incident on spatial light modulator 107 is spatially modulated to form an image. The image may be viewed through beam splitter 105. More specifically, the image on spatial light modulator 107 forms a first optical input of a beam combiner 109. Beam combiner 109 also comprises a second optical input 123 which provides a field of view of a real world scene.

Beam combiner 109 comprises a spherical surface 111 which causes the image from the spatial light modulator 107 to become divergent. The beam combiner 109 is further arranged to at least partially reflect the divergent image to an optical output 125 of the beam combiner.

Light received on the second optical input 123 is also directed to the optical output 125 of the beam combiner 109. In this respect, it may be understood that the beam combiner combines a real world image with a diverging image from the spatial light modulator 107. It can therefore be understood that a real world image is augmented with an image from a spatial light modulator. Notably, the device described with reference to FIG. 1 provides a spherical surface 111 so that the image on the spatial light modulator appears to have come from some fixed point in space behind the beam combiner. The image from the spatial light modulator 107 therefore appears to have come from some fixed point in space defined by the radius of curvature of the spherical surface 111.

The present disclosure aims to provide an improved near-eye device.

SUMMARY OF THE INVENTION

Aspects of an invention are defined in the appended independent claims.

There is provided a near-eye device, and corresponding method, using a beam combiner arranged to receive spatially modulated light from a spatial light modulator and provide a field of view of the real world. Accordingly, a real world scene may be supplemented or augmented with additional information in the form of an image. Known near-eye devices project a real image into the scene using a physical optical component to add eye relief. The inventors have recognised that advantageously, the image may be provided using a computational phase-only holographic technique. The technique is more energy efficient and enables additional optical elements to be effectively encoded or embedded in the image-forming data. Advantageously, additional complex components are not required. Further advantageously, the distance of the augmenting image may be controlled in real-time.

BRIEF DESCRIPTION OF THE DRAWINGS

Embodiments will now be described to the accompanying drawings in which.

In the drawings, like reference numerals referred to like parts.

DETAILED DESCRIPTION OF THE DRAWINGS

Figure 1:
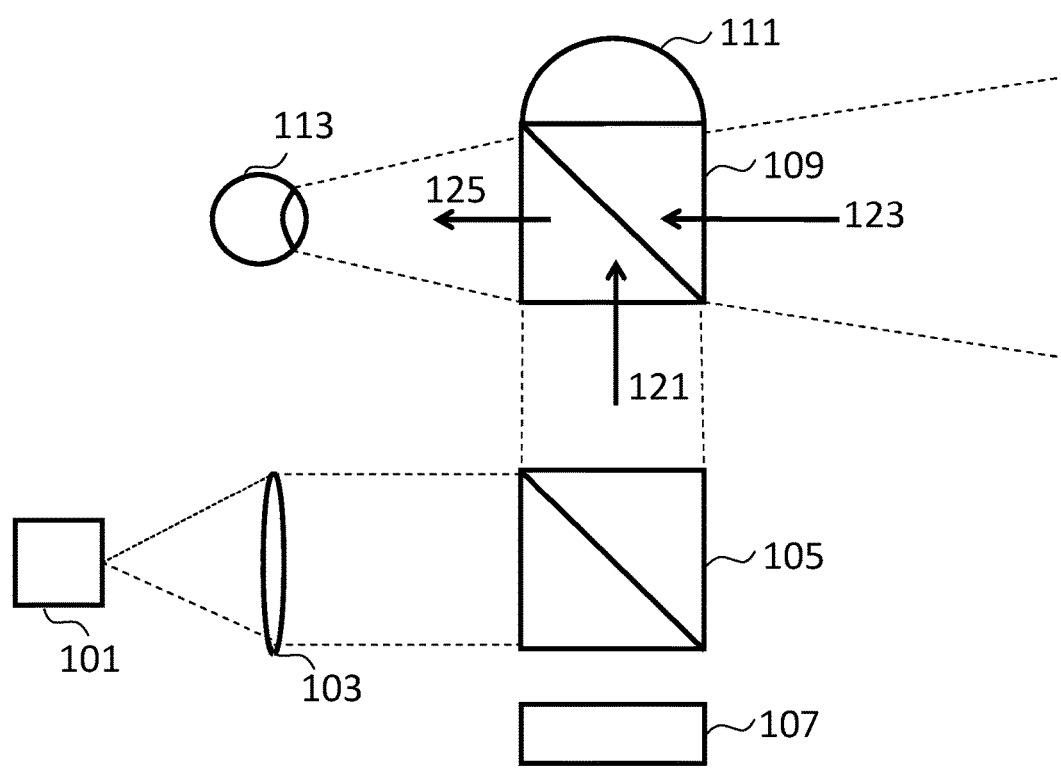
FIG. 1 is a schematic of a known near-eye device.

The present disclosure aims to provide an improved near-eye device by addressing some of the deficiencies with known devices using an image on a spatial light modulator and a beam combiner having a shaped surface for adding so-called eye relief. In particular, the inventors have recognised that an improved near-eye device may be provided by using a versatile computational holographic technique.

Light scattered from an object contains both amplitude and phase information. This amplitude and phase information can be captured on, for example, a photosensitive plate by well-known interference techniques to form a holographic recording, or "hologram", comprising interference fringes. The "hologram" may be reconstructed by illuminating it with suitable light to form a holographic reconstruction, or replay image, representative of the original object.

It has been found that a holographic reconstruction of acceptable quality can be formed from a "hologram" containing only phase information related to the original object. Such holographic recordings may be referred to as phase-only holograms. Computer-generated holography may numerically simulate the interference process, using Fourier techniques for example, to produce a computer-generated phase-only hologram. A computer-generated phase-only hologram may be used to produce a holographic reconstruction representative of an object.

The term "hologram" therefore relates to the recording which contains information about the object and which can be used to form a reconstruction representative of the object. The hologram may contain information about the object in the frequency, or Fourier, domain.

It has been proposed to use holographic techniques in a two-dimensional image projection system. An advantage of projecting images using phase-only holograms is the ability to control many image attributes via the computation method—e.g. the aspect ratio, resolution, contrast and dynamic range of the projected image. A further advantage of phase-only holograms is that no optical energy is lost by way of amplitude modulation.

A computer-generated phase-only hologram may be "pixellated". That is, the phase-only hologram may be represented on an array of discrete phase elements. Each discrete element may be referred to as a "pixel". Each pixel may act as a light modulating element such as a phase modulating element. A computer-generated phase-only hologram may therefore be represented on an array of phase modulating elements such as a liquid crystal spatial light modulator (SLM). The SLM may be reflective meaning that modulated light is output from the SLM in reflection.

Each phase modulating element, or pixel, may vary in state to provide a controllable phase delay to light incident on that phase modulating element. An array of phase modulating elements, such as a Liquid Crystal On Silicon (LCOS) SLM, may therefore represent (or "display") a computationally-determined phase-delay distribution. If the light incident on the array of phase modulating elements is coherent, the light will be modulated with the holographic information, or hologram. The holographic information may be in the frequency, or Fourier, domain.

Alternatively, the phase-delay distribution may be recorded on a kinoform. The word "kinoform" may be used generically to refer to a phase-only holographic recording, or hologram.

The phase delay may be quantised. That is, each pixel may be set at one of a discrete number of phase levels.

The phase-delay distribution may be applied to an incident light wave (by illuminating the LCOS SLM, for example) and reconstructed. The position of the reconstruction in space may be controlled by using a lens to perform an optical Fourier transform, to form the holographic reconstruction, or "image", in the spatial domain. Alternatively a lens may not be needed if the reconstruction takes place in the far-field.

A computer-generated hologram may be calculated in a number of ways, including using algorithms such as Gerchberg-Saxton. The Gerchberg-Saxton algorithm may be used to derive phase information in the frequency domain from amplitude information in the spatial domain (such as a 2D image). That is, phase information related to the object may be "retrieved" from intensity, or amplitude, only information in the spatial domain. Accordingly, a phase-only holographic representation of an object in the frequency domain may be calculated.

The holographic reconstruction may be formed by illuminating the hologram and—if necessary—performing an optical Fourier transform, using a Fourier transform lens, for example, to form an image (holographic reconstruction) at a reply field such as on a screen. In the case of a Fresnel hologram, the holographic reconstruction is formed at predetermined position.

Figure 2:
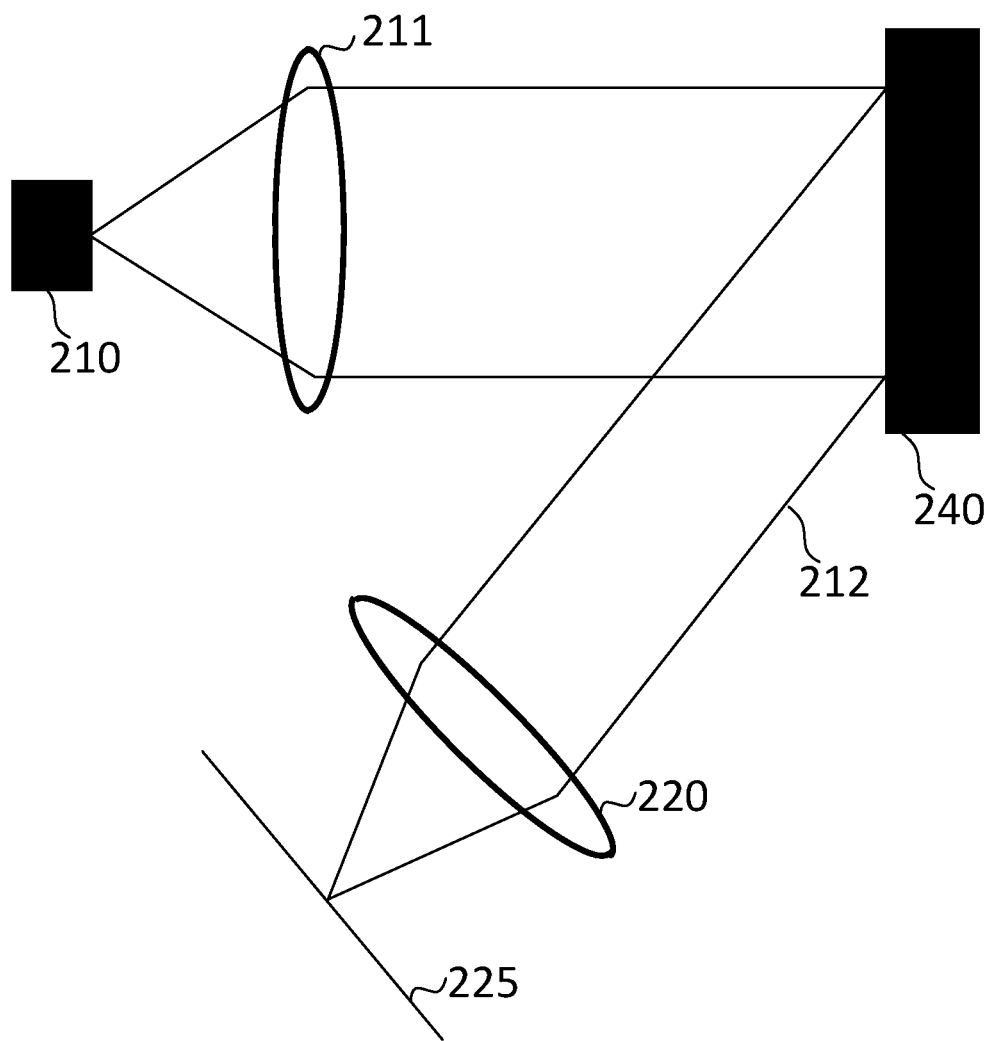
FIG. 2 showing a reflective SLM, such as a LCOS, arranged to produce a holographic reconstruction at a replay field location.

FIG. 2 shows an example of using a reflective SLM, such as a LCOS-SLM, to produce a Fourier holographic reconstruction at a replay field location, in accordance with the present disclosure.

A light source (210), for example a laser or laser diode, is disposed to illuminate the SLM (240) via a collimating lens (211). The collimating lens causes a generally planar wavefront of light to become incident on the SLM. The direction of the wavefront is slightly off-normal (e.g. two or three degrees away from being truly orthogonal to the plane of the transparent layer). The arrangement is such that light from the light source is reflected off a mirrored rear surface of the SLM and interacts with a phase-modulating layer to form an exiting wavefront (212). The exiting wavefront (212) is applied to optics including a Fourier transform lens (220), having its focus at a screen (225).

The Fourier transform lens (220) receives a beam of phase-modulated light exiting from the SLM and performs a frequency-space transformation to produce a holographic reconstruction at the screen (225) in the spatial domain.

In this process, the light—in the case of an image projection system, the visible light—from the light source is distributed across the SLM (240), and across the phase modulating layer (i.e. the array of phase modulating elements). Light exiting the phase-modulating layer may be distributed across the replay field. Each pixel of the hologram contributes to the replay image as a whole. That is, there is not a one-to-one correlation between specific points on the replay image and specific phase-modulating elements.

The Gerchberg Saxton algorithm considers the phase retrieval problem when intensity cross-sections of a light beam, $I_A(x,y)$ and $I_B(x,y)$, in the planes A and B respectively, are known and $I_A(x,y)$ and $I_B(x,y)$ are related by a single Fourier transform. With the given intensity cross-sections, an approximation to the phase distribution in the planes A and B, $\Phi_A(x,y)$ and $\Phi(x,y)$ respectively, is found. The Gerchberg-Saxton algorithm finds solutions to this problem by following an iterative process.

The Gerchberg-Saxton algorithm iteratively applies spatial and spectral constraints while repeatedly transferring a data set (amplitude and phase), representative of $I_A(x,y)$ and $I_B(x,y)$, between the spatial domain and the Fourier (spectral) domain. The spatial and spectral constraints are $I_A(x,y)$ and $I_B(x,y)$ respectively. The constraints in either the spatial or spectral domain are imposed upon the amplitude of the data set. The corresponding phase information is retrieved through a series of iterations.

Modified algorithms based on Gerchberg-Saxton have been developed—see, for example, co-pending published PCT application WO 2007/131650 incorporated herein by reference.

Figure 3:
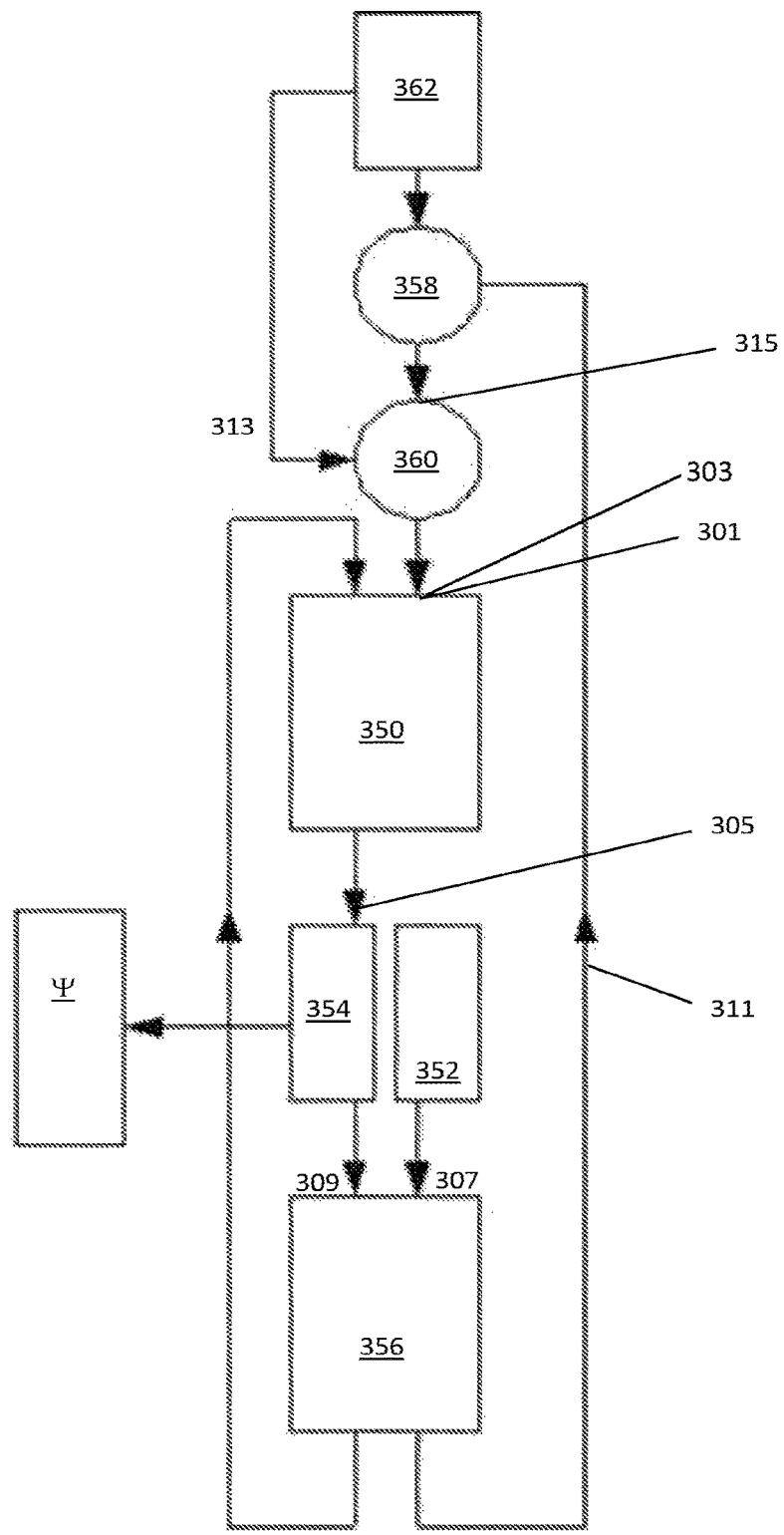
FIG. 3 shows an example algorithm for computer-generating a phase-only hologram.

FIG. 3 shows a modified algorithm which retrieves the phase information $\psi[u,v]$ of the Fourier transform of the data set which gives rise to a known amplitude information $T[x,y]$ 362. Amplitude information $T[x,y]$ 362 is representative of a target image (e.g. a photograph). The phase information $\psi[u,v]$ is used to produce a holographic representative of the target image at an image plane.

Since the magnitude and phase are intrinsically combined in the Fourier transform, the transformed magnitude (as well as phase) contains useful information about the accuracy of the calculated data set. Thus, the algorithm may provide feedback on both the amplitude and the phase information.

The algorithm shown in FIG. 3 can be considered as having a complex wave input (having amplitude information 301 and phase information 303) and a complex wave output (also having amplitude information 311 and phase information 313). For the purpose of this description, the amplitude and phase information are considered separately although they are intrinsically combined to form a data set. It should be remembered that both the amplitude and phase information are themselves functions of the spatial coordinates (x,y) for the farfield image and (u,v) for the hologram, both can be considered amplitude and phase distributions.

Referring to FIG. 3, processing block 350 produces a Fourier transform from a first data set having magnitude information 301 and phase information 303. The result is a second data set, having magnitude information and phase information $\psi_n[u,v]$ 305. The amplitude information from processing block 350 is set to a distribution representative of the light source but the phase information $\psi_n[u,v]$ 305 is retained. Phase information 305 is quantised by processing block 354 and output as phase information $\psi[u,v]$ 309. Phase information 309 is passed to processing block 356 and combined with the new magnitude by processing block 352. The third data set 307, 309 is applied to processing block 356 which performs an inverse Fourier transform. This produces a fourth data set $R_n[x,y]$ in the spatial domain having amplitude information 311 and phase information 313.

Starting with the fourth data set, its phase information 313 forms the phase information of a fifth data set, applied as the first data set of the next iteration 303'. Its amplitude information $R_n[x,y]$ 311 is modified by subtraction from amplitude information $T[x,y]$ 362 from the target image to produce an amplitude information 315 set. Scaled amplitude information 315 (scaled by $\alpha$) is subtracted from target amplitude information $T[x,y]$ 362 to produce input amplitude information $\eta[x,y]$ 301 of the fifth data set for application as first data set to the next iteration. This is expressed mathematically in the following equations:

$$R_{n+1}[x, y]=F'\{\exp(i\psi_n[u, v])\}$$

$$\psi_n[u, v]=\angle F\{\eta \cdot \exp(i \angle R_n[x, y])\}$$

$$\eta=T[x, y]-\alpha(|R_n[x, y]|-T[x, y])$$

Where:
F' is the inverse Fourier transform.
F if the forward Fourier transform.
R is the replay field.
T is the target image.
$\angle$ is the angular information.
$\psi$ is the quantized version of the angular information.
$\epsilon$ is the new target magnitude, $\epsilon \geq 0$
$\alpha$ is a gain element ~1

The gain element $\alpha$ may be predetermined based on the size and rate of the incoming target image data.

Figure 4:
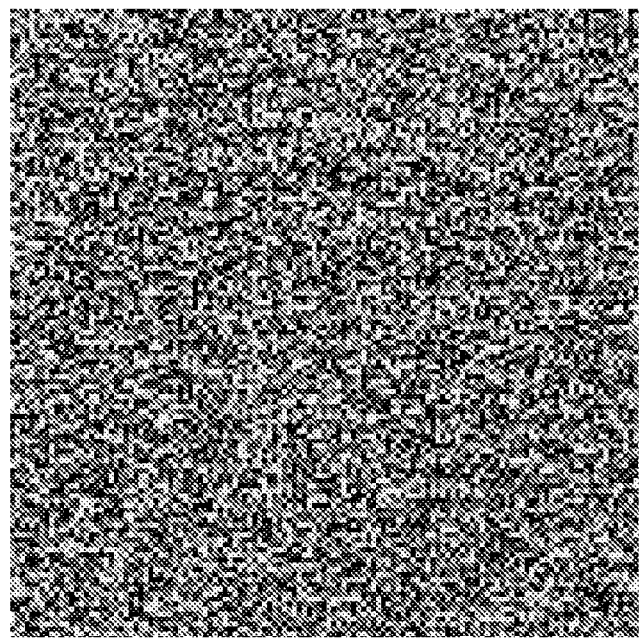
FIG. 4 shows an example random phase seed for the example algorithm of FIG. 3.

In the absence of phase information from the preceding iteration, the first iteration of the algorithm uses a random phase generator to supply random phase information as a starting point. FIG. 4 shows an example random phase seed.

In a modification, the resultant amplitude information from processing block 350 is not discarded. The target amplitude information 362 is subtracted from amplitude information to produce a new amplitude information. A multiple of amplitude information is subtracted from amplitude information 362 to produce the input amplitude information for processing block 356. Further alternatively, the phase is not fed back in full and only a portion proportion to its change over the last two iterations is fed back.

Accordingly, Fourier domain data representative of an image of interest may be formed.

Embodiments relate to phase-holograms by way of example only and it may be appreciated that the present disclosure is equally applicable to amplitude holograms.

The inventors have recognised limitations with the near-eye device show in FIG. 1:
 the device of FIG. 1 is energy inefficient because light is amplitude modulated which includes attenuating the majority of the light;
 the image which augments the real world view is perceived at a fixed (i.e. non-variable) position in space;
 additional optics may be required to compensation for optical aberrations and the like in optical components; and
 the spherical surface is expensive to fabricate as part of a combiner.

The inventors have addressed these problems by using a versatile holographic technique to form the image which augments the real world scene. This image may be referred to as the "augmenting image".

Figure 5:
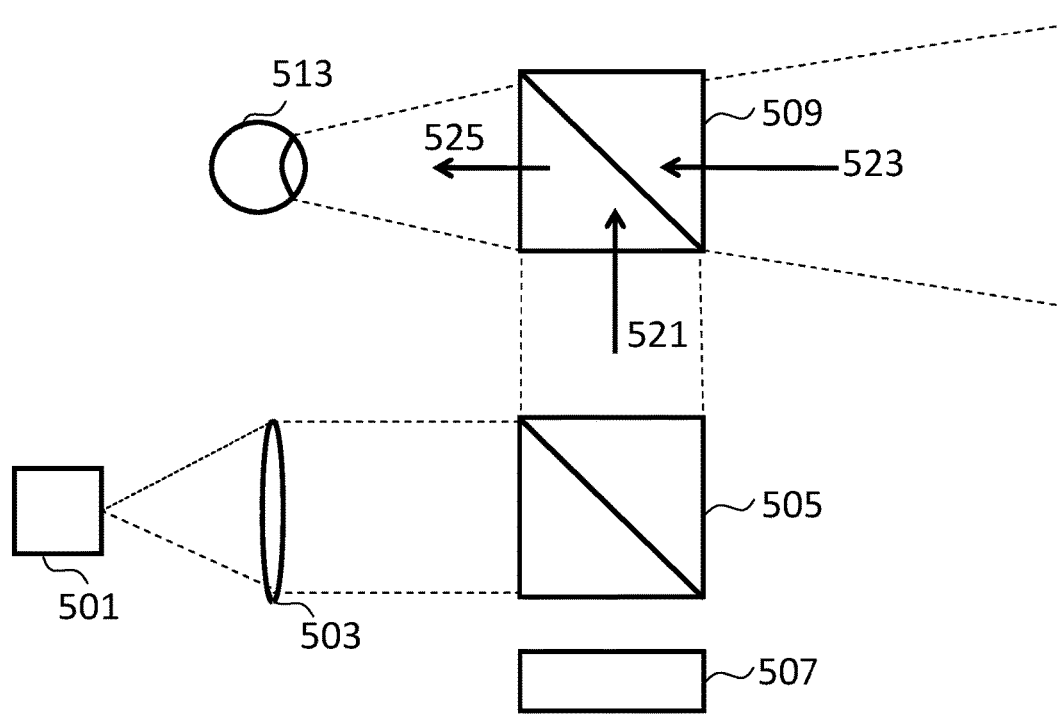
FIG. 5 shows an embodiment in accordance with the present disclosure.

FIG. 5 shows an embodiment of the present disclosure.

FIG. 5 shows a light source 501 and collimating lens 503 arranged to illuminate a spatial light modulator 507 via a beam splitter 505. Spatial light modulator 507 comprises an array of phase modulating elements (or "pixels") arranged to present (or "display") a holographic domain representation of an image. More specifically, the phase of light incident on spatial light modulator 507 is spatially modulated to form spatially modulated light. This spatially modulated light forms a first optical input of a beam combiner 509.

Beam combiner 509 also comprises a second optical input 523 which provides a field of view of a real world scene. The beam splitter 509 is further arranged to direct the spatially modulated light to an optical output 525 of the beam combiner. Light received on the second optical input 523 is also directed to the optical output 525 of the beam combiner 509. In this respect, it may be understood that the beam combiner combines a real world image with the spatial modulated light. It can therefore be understood that a real world image is augmented with light from a spatial light modulator.

It may be readily understood that beam splitter 505 is optional and the spatial light modulator 507 may equally be back-lit or illuminated in other geometries not requiring a beam splitter. Likewise, collimating lens 503 may not be required if, for example, the light emitted by the source is already collimated. Furthermore, the skilled person will understand that other techniques for collimating light may equally be used.

In contrast to the device described with reference to FIG. 1, the spatial light modulator 507 in accordance with the present disclosure spatially modulates the phase of incident light rather than the amplitude. Accordingly, the device is more energy efficient because light is not attenuated.

There is therefore provided a near-eye device comprising: a spatial light modulator comprising an array of phase modulating elements arranged to apply a phase delay distribution to incident light; a beam combiner comprising a first optical input arranged to receive spatially modulated light from the spatial light modulator and a second optical input having a field of view of the real world.

In further contrast to device of FIG. 1, spatial light modulator 507 displays a hologram corresponding to an image rather than a real image. That is, the spatially modulated light comprises phase-only holographic domain data representative of an image. Accordingly, the device is energy efficient because all parts of the hologram contribute to all parts of the reconstruction.

In embodiments, the hologram is a Fourier hologram. That is, the holographic domain data is a Fourier hologram. A Fourier hologram is a hologram in which the reconstruction is formed at infinity or at the focal point of a lens carrying out a Fourier transform. Advantageously, by using a Fourier hologram, a viewer's eye may perform the Fourier transform in order to form the holographic reconstruction on the retina. Accordingly, the distance between a viewer and the beam combiner is not critical. That is, a viewer may move towards and away from the beam combiner and still see the holographic reconstruction. The device is therefore more tolerant of viewer movement and provides increased design flexibility. That is, in embodiments, the spatially modulated light is arranged such that a user's eye performs a Fourier transform of the spatially modulated light such that the user sees a holographic reconstruction of the image.

Figure 6:
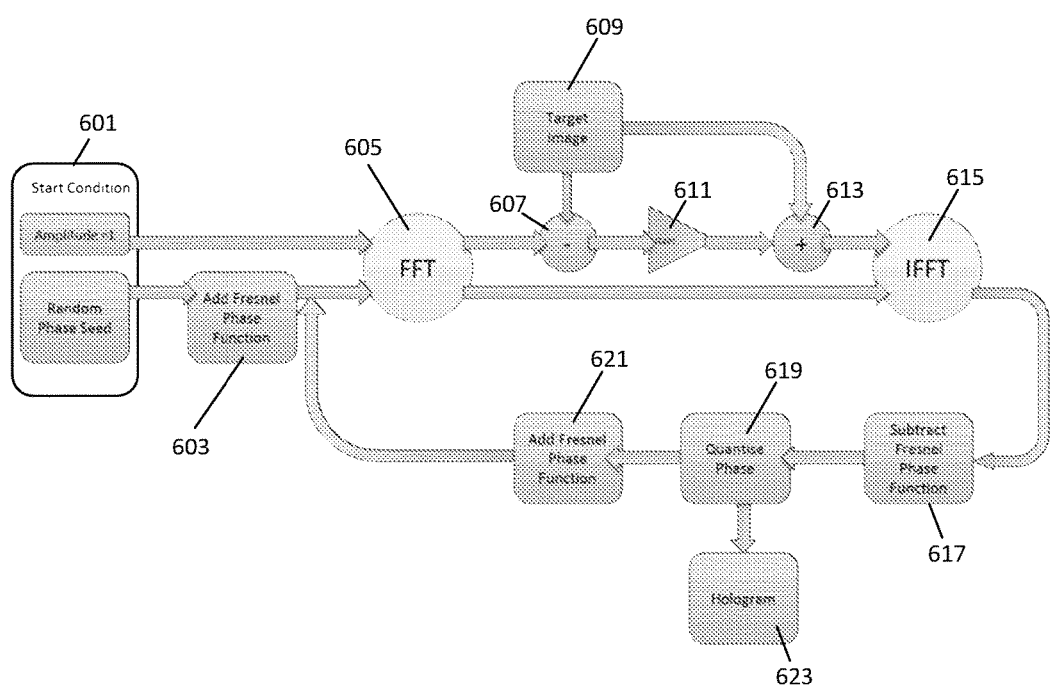
FIG. 6 is an algorithm for calculating a Fresnel hologram in accordance with embodiments.

Embodiments described herein relate to Fourier holography by way of example only. The present disclosure is equally applicable to Fresnel holography in which Fresnel lens functions are applied during calculation of the hologram. FIG. 6 shows an example Fresnel holographic algorithm for calculating the Fourier domain data representative of a target image for projection.

The start condition 601 for the phase retrieval algorithm is that each pixel has unity amplitude but a random phase provided by a random phase seed function. A Fresnel phase function 603 is added to the phase data. The resultant amplitude and phase function is Fourier transformed 605. The target image (amplitude only) 609 is subtracted from the amplitude component and a controllable gain 611 applied. The target image 609 is added to the amplitude component and an inverse Fourier transform 615 performed. The Fresnel lens function 617 is subtracted and the phase quantised 619. The resulting phase information forms the hologram 623. A further iteration of the loop may be performed by adding the Fresnel lens function 621 again and repeating the Fourier transform 615 and subsequent steps until an "acceptable" quality hologram is obtained.

In embodiments, the hologram is a Fresnel hologram. That is, the holographic domain data is a Fresnel hologram. In Fresnel holography, the holographic reconstruction is formed at some pre-determined point along the Fourier path. That is, in embodiments, the spatially modulated light is arranged to form a holographic reconstruction of the image at a replay plane in the near-field. Advantageously, with Fresnel holography, it is possible to create reconstructions at multiple planes in space from a single hologram. Therefore, multiple images may augment the real world scene at the same time.

In embodiments, the hologram further comprises lensing data. More specifically, hologram domain data having a lensing effect is combined—for example, added—to the hologram domain data represented of the image. This additional hologram data mimics a real lens and therefore adds optical power. The lensing data therefore controls where in space the image appears to the user. The skilled person knows how to calculate hologram domain data having a required lensing effect and how to add such data to other hologram domain data.

Accordingly, in an embodiment, the spatially modulated light further comprises phase-only holographic domain data having a lensing effect.

In embodiments, the hologram is a phase-only hologram and the lensing effect is provided by a phase-only lens. The phase-only hologram may be calculated in real-time or retrieved from a repository such as a database. The hologram may be calculated using a Gerchberg-Saxton type algorithm or any other algorithm for generating the appropriate hologram domain data. The skilled person will understand that the hologram may equally be an amplitude hologram, or an amplitude and phase hologram, and the lensing effect may also therefore be provided by an amplitude hologram, or an amplitude and phase hologram.

In embodiment, hologram domain data representative of the image is combined with hologram domain data having a lensing effect such that an addition element—such as a spherical surface on the beam combiner—is not required to add eye relief to the system. The cost of fabricating the system is therefore reduced. In particular, spherical surfaces with the required tolerance are expensive to fabricate.

In an embodiment, the two holographic data sets are combined by simple vector addition. In this respect, the hologram represented on the spatial light modulator comprises first data representative of the actual image for augmentation and second data comprising a lensing function. Notably, the lensing function may be readily changed by simply adding a different lensing function to the holographic data representing the image. This approach therefore also allows for real-time adjustment of the perceived position of the image if, for example, the system is realigned during use or the user wishes to display data at different distances.

In an embodiment, the lensing effect is a negative lensing effect. Accordingly, the image which augments the real world scene is effectively moved away from the user. That is, the image appears to have originated from further away than it actually did. More specifically, the image appears to have come from a point in space further away than the spatial light modulator. In this respect, it may be said that the lensing effect adds eye relief. Advantageously, by using a negative lensing effect, the image may therefore appear to a user to be within the real world scene. In other words, in an embodiment, the spatially modulated light is diverging.

In further embodiments, further optical power may be added to the hologram to compensation for other optical components. In an embodiment, the spatially modulated light further comprises phase-only holographic domain data arranged to compensate for aberrations in other optical components of the near-eye device. Again, it may be understood that the phase-only holographic domain data arranged to compensate for aberrations may be computationally controlled and therefore readily changed.

It may be understood from the foregoing that in embodiments, the image (holographic reconstruction) augments the real world scene. In embodiments, this augmentation is achieved optically. In an embodiment, the first optical input and second optical input are co-linear. In an embodiment, the beam combiner further comprises an optical output arranged to combine the light received on the first optical input with light received on the second optical input. Accordingly, a simple and convenient method for augmenting the real world scene with the image is provided. More specifically, in an embodiment, the optical output is arranged to at least partially overlay the light received on the first optical input with the light received on the second optical input.

In an embodiment, the near-eye device is arranged for a user of the near-eye device to receive the optical output from the beam combiner. The holographic reconstruction may be used to provide the user with additional information. The holographic reconstruction may also be used to provide an artificial scene. In an embodiment, the holographic reconstruction of the image augments the field of view of the real world.

It may be understood that the device requires a light source but that light source may be external to the near-eye device or may be integral with the near-eye device. In an embodiment, the near-eye device further comprises a light source arranged to illuminate the spatial light modulator.

For simplicity, the incident light may be a plane wave. However, it may be understood that the hologram is tailored to the incident light to form the required light after spatial modulation which reconstructs to form the desired image. That is, the incident light may not be a plane wave. However, in an embodiment, the light source is arranged to illuminate the spatial light modulator with a plane wave of light.

In an embodiment, the near-eye device is a pair of goggles or glasses. The skilled person will understand that near-eye device may take other known forms. The image may be a video image or may be time-variant. The image may move in time. The image may also be a still image.

There is therefore provided a method of providing augmented reality using a near-eye device, the method comprising: providing holographic data comprising phase-only holographic domain data representative of an image; spatially modulating light with the holographic data to form spatially modulated light; and combining the spatially modulated light with a field of view of the real world using a beam combiner. In an embodiment, the holographic data further comprises phase-only holographic domain data having a lensing effect. In an embodiment, the holographic domain data is at least one of a Fourier hologram and a Fresnel hologram.

The light may be spatially modulated using a spatial light modulator such as a liquid crystal on silicon SLM. It can be understood that the holographic data is written to the SLM such that an incident plane wave of light is spatially modulated with the holographic data. In this respect, it may be considered that the pixels of the SLM "display" or "represent" the holographic data.

It can be understood that the device may display a variety of information. Holograms corresponding to a number of possible images for display may be therefore be pre-calculated and stored in a repository, or calculated in real-time. In an embodiment, there is provided a repository of hologram domain data respectively representative of a plurality of images. Likewise, in embodiments, there is provided a repository of hologram domain data having different lensing effects. In further embodiments, a look-up table of the optical power of various sets of lensing data is provided.

In Fourier holography, the quality of the reconstructed image may be affect by the so-called zero order problem which is a consequence of the diffractive nature of the reconstruction. Such zero-order light can be regarded as "noise" and includes for example specularly reflected light, and other unwanted light from the SLM.

This "noise" is generally focussed at the focal point of the Fourier lens, leading to a bright spot at the centre of a reconstructed image. Conventionally, the zero order light is simply blocked out however this would clearly mean replacing the bright spot with a dark spot.

However as the hologram contains three dimensional information, it is possible to displace the reconstruction into a different plane in space—see, for example, published PCT application WO 2007/131649 incorporated herein by reference.

Alternatively and angularly selective filter could be used to remove only the collimated rays of the zero order. Other methods of managing the zero order may also be used.

Whilst embodiments described herein relate to displaying an image, the present disclosure is by no means limited in this respect and more than one hologram may be displayed on the SLM at any one time.

For example, embodiments implement the technique of "tiling", in which the surface area of the SLM is further divided up into a number of tiles, each of which is set in a phase distribution similar or identical to that of the original tile. Each tile is therefore of a smaller surface area than if the whole allocated area of the SLM were used as one large phase pattern. The smaller the number of frequency component in the tile, the further apart the reconstructed pixels are separated when the image is produced. The image is created within the zeroth diffraction order, and it is preferred that the first and subsequent orders are displaced far enough so as not to overlap with the image and may be blocked by way of a spatial filter.

As mentioned above, the image produced by this method (whether with tiling or without) comprises spots that form image pixels. The higher the number of tiles used, the smaller these spots become. If one takes the example of a Fourier transform of an infinite sine wave, a single frequency is produced. This is the optimum output. In practice, if just one tile is used, this corresponds to an input of a single cycle of a sine wave, with a zero values extending in the positive and negative directions from the end nodes of the sine wave to infinity. Instead of a single frequency being produced from its Fourier transform, the principle frequency component is produced with a series of adjacent frequency components on either side of it. The use of tiling reduces the magnitude of these adjacent frequency components and, as a direct result, less interference (constructive or destructive) occurs between adjacent image pixels, thereby improving the image quality.

Preferably, each tile is a whole tile, although it is possible to use fractions of a tile.

Although embodiments relate to variants of the Gerchberg-Saxton algorithm, the skilled person will understand that other phase retrieval algorithms may implement the improved method disclosed herein.

The skilled person will understand that the improved method disclosed herein is equally applicable to the calculation of a hologram used to form a three-dimensional reconstruction of an object.

Equally, the present disclosure is not limited to projection of a monochromatic image.

A colour 2D holographic reconstruction can be produced and there are two main methods of achieving this. One of these methods is known as "frame-sequential colour" (FSC). In an FSC system, three lasers are used (red, green and blue) and each laser is fired in succession at the SLM to produce each frame of the video. The colours are cycled (red, green, blue, red, green, blue, etc.) at a fast enough rate such that a human viewer sees a polychromatic image from a combination of the three lasers. Each hologram is therefore colour specific. For example, in a video at 25 frames per second, the first frame would be produced by firing the red laser for $1/75$th of a second, then the green laser would be fired for $1/75$th of a second, and finally the blue laser would be fired for $1/75$th of a second. The next frame is then produced, starting with the red laser, and so on.

An alternative method, that will be referred to as "spatially separated colours" (SSC) involves all three lasers being fired at the same time, but taking different optical paths, e.g. each using a different SLM, or different area of a single SLM, and then combining to form the colour image.

An advantage of the frame-sequential colour (FSC) method is that the whole SLM is used for each colour. This means that the quality of the three colour images produced will not be compromised because all pixels on the SLM are used for each of the colour images. However, a disadvantage of the FSC method is that the overall image produced will not be as bright as a corresponding image produced by the SSC method by a factor of about 3, because each laser is only used for a third of the time. This drawback could potentially be addressed by overdriving the lasers, or by using more powerful lasers, but this would require more power to be used, would involve higher costs and would make the system less compact.

An advantage of the SSC (spatially separated colours) method is that the image is brighter due to all three lasers being fired at the same time. However, if due to space limitations it is required to use only one SLM, the surface area of the SLM can be divided into three equal parts, acting in effect as three separate SLMs. The drawback of this is that the quality of each single-colour image is decreased, due to the decrease of SLM surface area available for each monochromatic image. The quality of the polychromatic image is therefore decreased accordingly. The decrease of SLM surface area available means that fewer pixels on the SLM can be used, thus reducing the quality of the image. The quality of the image is reduced because its resolution is reduced.

In embodiments, the SLM is a Liquid Crystal over silicon (LCOS) device. LCOS SLMs have the advantage that the signal lines, gate lines and transistors are below the mirrored surface, which results in high fill factors (typically greater than 90%) and high resolutions.

LCOS devices are now available with pixels between 4.5 μm and 12 μm.

Figure 7:
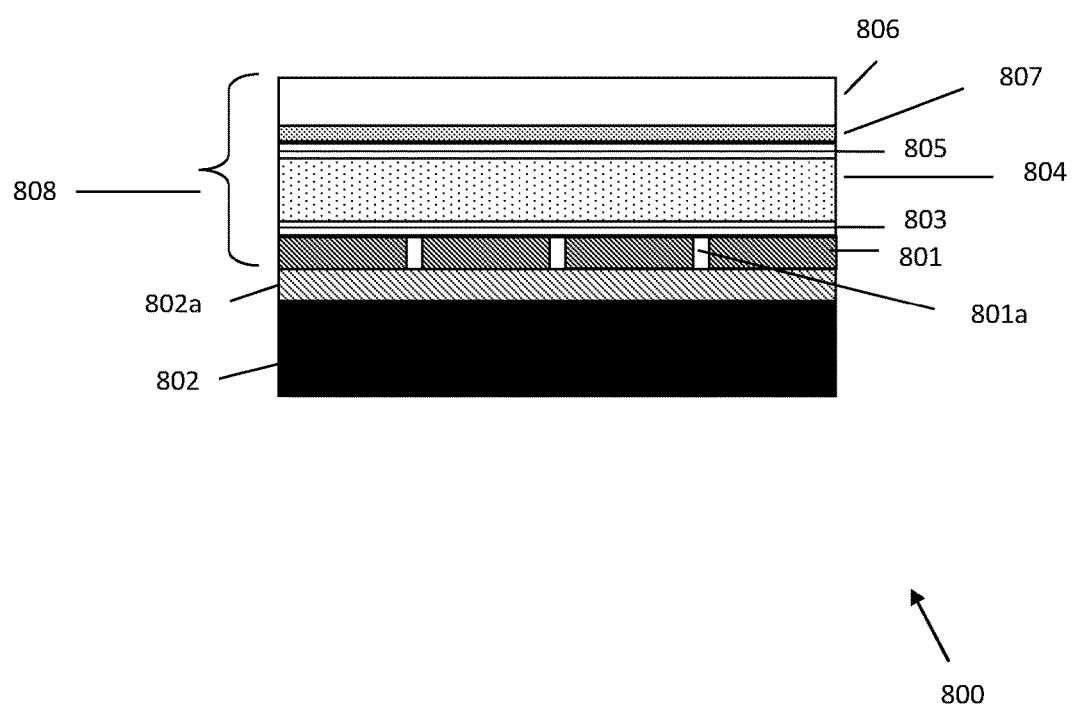
FIG. 7 is a schematic of a LCOS SLM.

The structure of an LCOS device is shown in FIG. 7.

A LCOS device is formed using a single crystal silicon substrate (802). It has a 2D array of square planar aluminium electrodes (801), spaced apart by a gap (801a), arranged on the upper surface of the substrate. Each of the electrodes (801) can be addressed via circuitry (802a) buried in the substrate (802). Each of the electrodes forms a respective planar mirror. An alignment layer (803) is disposed on the array of electrodes, and a liquid crystal layer (804) is disposed on the alignment layer (803). A second alignment layer (805) is disposed on the liquid crystal layer (804) and a planar transparent layer (806), e.g. of glass, is disposed on the second alignment layer (805). A single transparent electrode (807) e.g. of ITO is disposed between the transparent layer (806) and the second alignment layer (805).

Each of the square electrodes (801) defines, together with the overlying region of the transparent electrode (807) and the intervening liquid crystal material, a controllable phase-modulating element (808), often referred to as a pixel. The effective pixel area, or fill factor, is the percentage of the total pixel which is optically active, taking into account the space between pixels (801a). By control of the voltage applied to each electrode (801) with respect to the transparent electrode (807), the properties of the liquid crystal material of the respective phase modulating element may be varied, thereby to provide a variable delay to light incident thereon. The effect is to provide phase-only modulation to the wavefront, i.e. no amplitude effect occurs.

A major advantage of using a reflective LCOS spatial light modulator is that the liquid crystal layer can be half the thickness than would be necessary if a transmissive device were used. This greatly improves the switching speed of the liquid crystal (a key point for projection of moving video images). A LCOS device is also uniquely capable of displaying large arrays of phase only elements in a small aperture. Small elements (typically approximately 10 microns or smaller) result in a practical diffraction angle (a few degrees) so that the optical system does not require a very long optical path.

It is easier to adequately illuminate the small aperture (a few square centimetres) of a LCOS SLM than it would be for the aperture of a larger liquid crystal device. LCOS SLMs also have a large aperture ratio, there being very little dead space between the pixels (as the circuitry to drive them is buried under the mirrors). This is an important issue to lowering the optical noise in the replay field.

The above device typically operates within a temperature range of 10° C. to around 50° C., with the optimum device operating temperature being around 40° C. to 50° C., depending however on the LC composition used.

Using a silicon backplane has the advantage that the pixels are optically flat, which is important for a phase modulating device.

Whilst embodiments relate to a reflective LCOS SLM, the skilled person will understand that any SLM can be used including transmissive SLMs.

The invention is not restricted to the described embodiments but extends to the full scope of the appended claims.

The invention claimed is:

1. A near-eye device comprising:
   a spatial light modulator comprising an array of phase modulating elements arranged to apply a phase delay distribution to incident light, the spatial light modulator displaying holographic data to apply the phase delay distribution, the holographic data comprising phase-only holographic domain data representative of an image and phase-only holographic domain data having a lensing effect;
   a light source arranged to illuminate the spatial light modulator with the incident light;
   a beam combiner comprising a first optical input arranged to receive spatially modulated light from the spatial light modulator, a second optical input having a field of view of the real world,
   wherein the lensing effect is such that the spatially modulated light received from the spatial light modulator by the beam combiner is diverging.

2. A near-eye device as claimed in claim 1 wherein the holographic domain data is a Fourier hologram.

3. A near-eye device as claimed in claim 2 wherein the spatially modulated light is arranged such that a user's eye performs a Fourier transform of the spatially modulated light such that the user sees a holographic reconstruction of the image.

4. A near-eye device as claimed in claim 1 wherein the holographic domain data is a Fresnel hologram.

5. A near-eye device as claimed in claim 4 wherein the spatially modulated light is arranged to form a holographic reconstruction of the image at a replay plane in the near-field.

6. A near-eye device as claimed in claim 1 wherein the lensing effect is a negative lensing effect.

7. A near-eye device as claimed in claim 1 wherein the holographic data further comprises phase-only holographic domain data arranged to compensate for aberrations in other optical components of the near-eye device.

8. A near-eye device as claimed in claim 1 wherein the beam combiner further comprises an optical output arranged to combine the light received on the first optical input with light received on the second optical input.

9. A near-eye device as claimed in claim 1 wherein the optical output is arranged to at least partially overlay the light received on the first optical input with the light received on the second optical input.

10. A near-eye device as claimed in claim 1 arranged for a user of the near-eye device to receive the optical output of the beam combiner.

11. A near-eye device as claimed in claim 1 wherein a holographic reconstruction of the image augments the field of view of the real world.

12. A near-eye device as claimed in claim 1 wherein the light source is arranged to illuminate the spatial light modulator with a plane wave of light as the incident light.

13. A near-eye device as claimed in claim 1 wherein the near-eye device is a pair of goggles or glasses.

14. A method of providing augmented reality using an near-eye device, the method comprising:

providing holographic data comprising phase-only holographic domain data representative of an image and phase-only holographic domain data having a lensing effect;

causing a spatial light modulator to spatially modulate light with the holographic data to form spatially modulated light; and combining the spatially modulated light with a field of view of the real world using a beam combiner, wherein the lensing effect is such that the spatially modulated light received from the spatial light modulator by the beam combiner is diverging.

15. A method of providing augmented reality as claimed in claim 14 wherein the holographic domain data is a Fourier hologram or a Fresnel hologram.

16. A method of providing augmented reality as claimed in claim 14, wherein the holographic data further comprises phase-only holographic domain data configured to compensate for aberrations in optical components of the near eye device, the method compensating for the aberrations.

\* \* \* \* \*